Patented Sept. 16, 1930

1,775,640

UNITED STATES PATENT OFFICE

ROBERT GRIESSBACH AND JULIUS EISELE, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF METAL OXIDS

No Drawing. Application filed November 29, 1926, Serial No. 151,594, and in Germany December 11, 1925.

When metal oxids, for example those of thorium, aluminium, iron, chromium and the like, are to be employed as catalysts, it is necessary in order to obtain a good catalytic efficiency to employ them in a state of greatest dispersion possible. As it is difficult to work with catalysts in the form of a fine powder, preference is given in many cases to oxids having the form of glass-like, coarse-grained gels of great mechanical strength. It has been found that such gels can be prepared by dehydrating hydrosols, but satisfactory results are only obtained when starting from highly concentrated hydrosols the dehydration of which requires only a short time. However, the preparation of highly concentrated hydrosols is rather difficult.

We have now found that highly concentrated hydrosols of the said metal oxids can be obtained by peptizing freshly precipitated hydroxids (after washing until free from electrolyte and preferably freeing from water as far as possible, for example by treatment in a filter press) by means of chemical agents such as suitable salts or acids while at the same time subjecting them to a mechanical dispersion by treatment for example in a ball mill or beating cross mill or by vigorously stirring or the like. By this means highly concentrated sols can be obtained with the aid of very small quantities of peptizing agents, as the latter are present in a comparatively high concentration due to the small quantity of water. A small content of peptizing agent and a high concentration of the hydrosol are also essential for the further treatment, because generally with an increased content of peptizing agent the gel character of the products more and more disappears and a prolonged dehydration is also of unfavorable influence. The highly concentrated viscous hydrosols obtained according to our said process are dried under mild conditions, preferably in vacuo. In order to convert them into stable gels they are finally heated to between about 500° and 600° C., preferably by degrees. By this process coarse-grained, hard gels of glass-like appearance are obtained which are irreversible in contact with water and are characterized by a high adsorbing and catalytic efficiency.

The process here described is applicable to all metal hydroxids which are capable of forming chemical or molecular compounds with water, such as iron hydroxid, alumina, thoria, chromium hydroxid and the like.

The process is applicable also when mixed gels consisting of several metal oxids are to be prepared. We have found that in this instance salts are less suitable for use as peptizing agents than acids, among which readily volatile mineral acids such as hydrochloric or nitric acid give especially good results. We have further found that particularly valuable mixed gels are obtained by starting from equimolecular proportions of the components.

The following examples will further illustrate how our invention may be carried out in practice, but the invention is not limited to these examples.

Example 1

1 kilogram of thorium nitrate is dissolved in 30 litres of water and precipitated as hydroxid by means of the theoretically required quantity of ammonia. The hydroxid is filtered off and washed until free from electrolyte and then heated to about 100° C. while vigorously agitating with a stirrer until a thinly liquid mass is formed. While continuing the stirring at the same temperature so much of crystallized thorium nitrate is gradually added as corresponds to 29 grammes of anhydrous thorium nitrate. The mass is further heated until a clear sol is obtained. The sol is evaporated in vacuo as far as possible and then heated while slowly raising the temperature to 500° to 600° C. Hard, glass-like lumps of a gel are obtained which is irreversible with water and of a high catalytic efficiency.

Example 2

0.5 kilogram of thorium nitrate and 1 kilogram of aluminium nitrate are dissolved and both metals are precipitated with ammonia as hydroxids. The hydroxid mixture is filtered off, washed and then mechanically dispersed by stirring at 100° C., while gradually adding

150 to 160 cubic centimetres of double normal nitric acid until a clear sol is obtained. The further treatment is the same as described in Example 1.

*Example 3*

3.7 kilograms of aluminium nitrate and 1 kilogram of iron nitrate are dissolved and both metals precipitated with ammonia as hydroxids. After being filtered off and washed, the hydroxids are treated at about 100° C. in a batting—or ball mill with so much of double normal nitric acid as to obtain a clear sol. From this sol hard pieces of a gel of glass-like character are obtained by further treatment according to Example 1.

What we claim is:

1. The process of producing metal oxid gels of high adsorbing and catalytic efficiency which comprises peptizing a freshly precipitated metal hydroxid by the action of an agent of acid reaction and intensive agitation, dehydrating the resulting highly concentrated hydrosol under mild conditions and heating it slowly to between 500° and 600° C.

2. The process of producing metal oxid gels of high adsorbing and catalytic efficiency which comprises peptizing a freshly precipitated metal hydroxid in the form of a concentrated suspension by treatment with an acid and by intensive agitation, dehydrating the resulting highly concentrated hydrosol in vacuo and heating it slowly by degrees to between 500° and 600° C.

In testimony whereof we have hereunto set our hands.

ROBERT GRIESSBACH.
JULIUS EISELE.